(No Model.)
R. WHITAKER.
SAW SHARPENING DEVICE.
No. 539,464. Patented May 21, 1895.
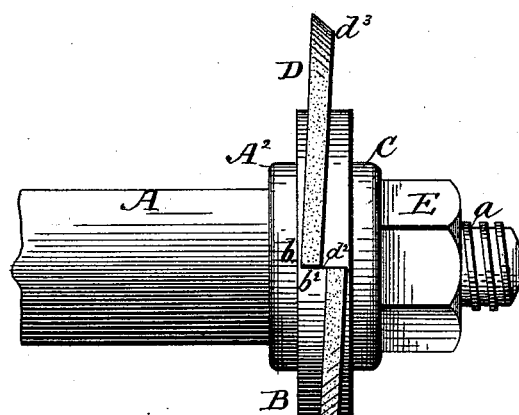
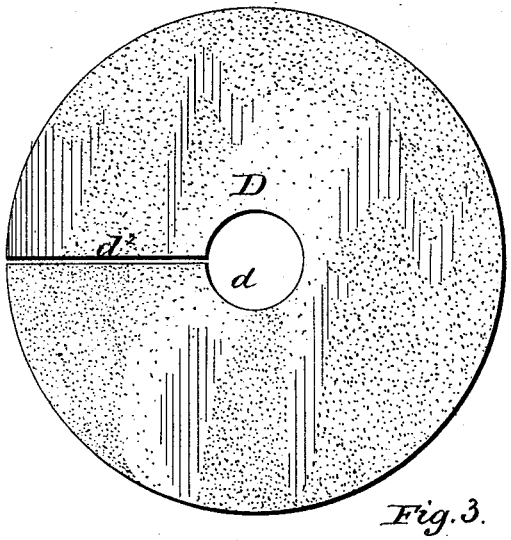
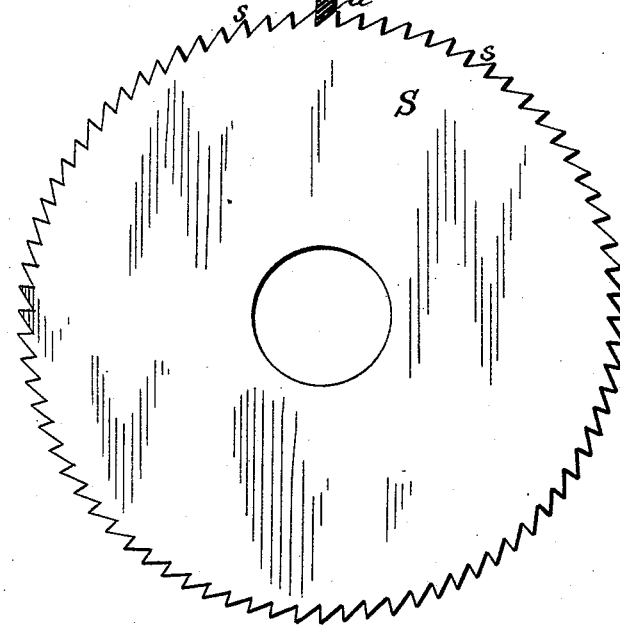
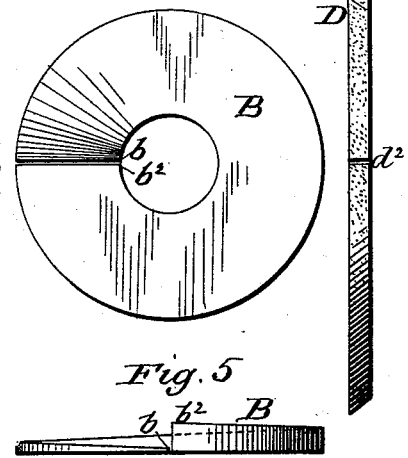
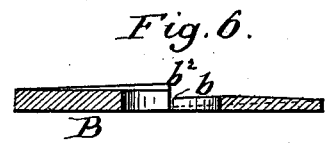
WITNESSES
A.B. Degges
L.D. Heinrichs
INVENTOR
Richard Whitaker,
by E.E. Masson, Attorney.

UNITED STATES PATENT OFFICE.

RICHARD WHITAKER, OF NEW BRUNSWICK, NEW JERSEY, ASSIGNOR OF ONE-HALF TO JAMES W. JOHNSON, OF SAME PLACE.

SAW-SHARPENING DEVICE.

SPECIFICATION forming part of Letters Patent No. 539,464, dated May 21, 1895.

Application filed March 22, 1895. Serial No. 542,772. (No model.)

*To all whom it may concern:*

Be it known that I, RICHARD WHITAKER, a citizen of the United States, residing at New Brunswick, in the county of Middlesex, State of New Jersey, have invented certain new and useful Improvements in Saw-Sharpening Devices, of which the following is a specification, reference being had therein to the accompanying drawings.

My invention relates to rotary saw sharpening devices or grinding wheels having a spirally formed periphery adapted to engage with the teeth of a saw and grind them, and at the same time advance or slowly revolve the saw, so that each tooth may come successively in contact with the grinding device and be properly sharpened; and the objects of my improvement are to produce a simple and inexpensive saw sharpening device of this class from a disk of abrading material or containing abrading material but possessing the desired amount of resilience or elasticity, by cutting a slot or forming an incision therein from its eye to its periphery, applying spirally faced washers against its faces, and clamping them and the disk, so that the faces of the disk are sprung laterally and the faces and the periphery of the latter assume a spiral form while thus clamped; but said spiral disk is adapted to assume again the form of a flat disk when released from pressure of the spirally faced washers and particularly when clamped between flat-faced washers; in which condition its edge can be easily trued with diamond or other suitable abrading tools. I attain these objects by the construction illustrated in the accompanying drawings, in which—

Figure 1 represents in front view a portion of a shaft or mandrel carrying a saw-sharpening device constructed in accordance with my invention, the edge of the spirally-faced abrading-disk being shown in engagement with the teeth of a saw. Fig. 2 is a face view of the abrading-disk. Fig. 3 is an edge view of the abrading-disk before its faces have been sprung spirally or after it has been released from its spirally-faced clamps or washers. Fig. 4 is a face view of one of said washers. Fig. 5 is an edge view of said washer. Fig. 6 is a diametrical section of one of said washers.

In said drawings A represents a mandrel provided with a collar $A^2$ secured thereto. Along one side of said collar the mandrel is of reduced diameter and has mounted thereon a washer B that has a plane face on the side that lies against the collar $A^2$ while the opposite side is spirally faced, being, for example, thin on line $b$ while it is much thicker on the adjacent parallel line $b^2$. Against this spirally formed face is placed an abrading disk D having a suitable amount of elasticity or resilience, its eye $d$ receiving the reduced portion $a$ of the mandrel. The novelty of construction in the disk D is its resilience in connection with a slot or incision $d^2$ made through its body from its eye to its periphery, said incision following preferably one of the radii of the disk. When said disk is placed upon the mandrel $a$, some care is taken that its incision $d^2$ coincides with the lines $b$ $b^2$ of the washer B. Another washer $B^2$ spirally faced as the washer B is then placed upon the mandrel $a$ with its spiral face against the disk D and its lines $b$ $b^2$ coinciding with the incision $d^2$ of said disk. A washer C having plane faces on both sides, is then placed upon the mandrel $a$, and a nut E is placed upon the screw threaded end of said mandrel and made to engage therewith. By forcing the nut E against the washer C, the latter forces the thick portion of the washer $B^2$ against the disk D along one side of its radial incision $d^2$, while the thick portion of the washer B forces in the opposite direction the disk D along the opposite side of its incision $d^2$. By these simple means the faces of the disk D take the form of spiral planes and its edge $d^3$ a spiral edge, well adapted to engage with the teeth $s$ of a saw S that may be mounted on any of the well known saw filing machines, and its too rapid rotation prevented by a weight placed thereon or by any other suitable brake.

The edge $d^3$ of the abrading disk may be of any desired form to fit the edge of the saw teeth upon which it is intended to be used, and when said edge becomes uneven, or indented, or when it is desired to change its form, it can be easily made true again, or its form changed with a diamond or other suitable tool. For this purpose the disk D is removed from the mandrel $a$ and clamped between washers having flat faces on both sides, either upon said mandrel $a$ or upon the mandrel of a lathe on which it assumes the form shown in Fig. 3, and revolved against its truing tool.

The spirally faced washers B, may be of leather, wood, metal or other suitable material; and as the abrading disk D will have more tendency to resist lateral springing adjacent to its eye than adjacent to its periphery, the uneven strain on said disk can be prevented by diminishing the difference of thickness of the washers B along their lines $b\ b^2$ at the eye as shown in Fig. 6—in other words by making the washer on the line $b$ slightly thicker adjacent to its eye than at its periphery, and on the line $b^2$ thinner adjacent to the eye than at the periphery.

The abrading disk D may be made to obtain its resilience from a small amount of india rubber, gutta percha, or other gum or material added to its abrading material.

Having now fully described my invention, I claim—

1. In combination with a disk consisting of resilient and abrading material having an eye in its center and an incision in said material from its eye to its periphery, two washers, each having one of its faces spirally formed and bearing against the faces of the abrading disk substantially as described.

2. The combination of a mandrel provided with a collar, a washer having one of its faces spirally formed, a resilient abrading disk having an incision through its body from its central eye to its periphery, a second washer having one of its faces spirally formed, and means to force the spiral faces of said washer against the sides of the slitted abrading disk substantially as described.

In testimony whereof I affix my signature in presence of two witnesses.

RICHARD WHITAKER.

Witnesses:
L. MATHEWS,
EDWARD MORRIS.